D. J. RIKER.
Thill-Coupling.
No. 24,405.
Patented June 14, 1859.
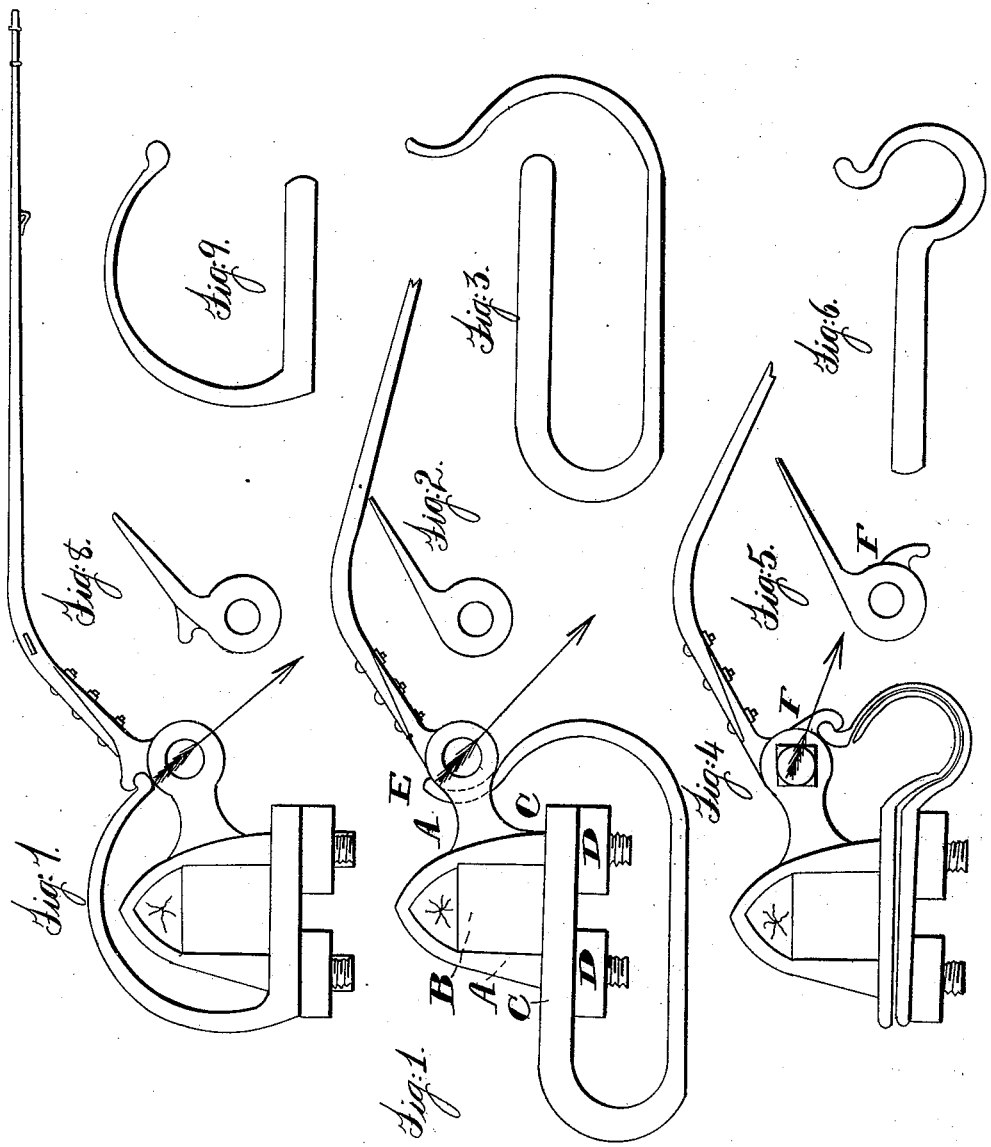
Witnesses
James Riker
J. Mahn
Inventor
Dav'd. J. Riker

UNITED STATES PATENT OFFICE.

DANIEL J. RIKER, OF NEW YORK, N. Y.

CLIP FOR CARRIAGE-THILLS.

Specification of Letters Patent No. 24,405, dated June 14, 1859.

*To all whom it may concern:*

Be it known that I, DANIEL J. RIKER, of Harlem, in the city and county and State of New York, have invented a new and useful combination of carriage clip and spring and the application thereof to a carriage in conjunction with or without a projection upon the shaft or pole-eye, so that by said combination and application I am enabled to prevent the rattling and wear in the hinged joint formed by said clip in connection with the shaft or pole-eye of a carriage; and I do hereby declare that the following is a full and exact description thereof, reference being had to the accompanying drawings and to the letters of reference marked thereon.

Figure 1, represents a side view of a carriage clip A A secured to a cross section of an axle B by means of the bar C C with the bolts and nuts D D. This clip is of the ordinary form and size such as are now in use, and adapted to a ⅞ inch carriage axle; with this exception, viz. that whereas in the ordinary form the bar C C would only extend across the under side of clip and axle to the outside of the clip nuts, I have in this arrangement extended the bar (which I make of steel or any other suitable metal,) from the point C in a curvilinear form to and partly around the end of shaft or pole-eye, to the point E, which shaft-eye can be seen in Fig. 2, as detached from the clip. By this extension of bar from the point C to the point E I am enabled to form a spring and adjust the set or power so as to bring a slight pressure (in the direction of the arrow) against the external surface of the shaft-eye when attached by means of a bolt to the clip. By said pressure against the shaft-eye the surfaces of the bolt and eye (in the direction of the arrow) are kept in contact at all times thereby preventing any rattle in the hinged joint of shaft, and also greatly diminishing the wear in the same. This form of spring and the application thereof to a shaft-eye as shown in Figs. 1 and 2, I consider will answer best on common carriages already built, as it will not require any alteration of the shaft-eye in its application to them.

Fig. 4 is a side view of a clip spring and axle which I have drawn in order to show, first, that my spring can intersect either end of the bar; second, that its curved form may be varied so as to adapt it to the different forms of application that are admissible; third, that I can use more than one leaf in my spring by placing two or more of them together if required; fourth, that by forming a projection upon the lower side of shaft-eye and allowing the spring to act forward and below the center of said eye I can counterbalance the weight of shafts or pole, thereby relieving the horse of such pressure or weight, which is desirable in light trotting vehicles:—the spring or springs, operating in conjunction with the weight of the shafts, bringing the surfaces of the hinged joints together (in the direction of the arrows,) thereby prevent rattle and wear as in Fig. 1.

Fig. 7 represents a side view of a clip spring and axle, and is intended to show the operation of a spring in connection with a top projection on a shaft-eye. By this method I can stop the rattle and wear in the hinged joint while the shafts or pole is in a horizontal position, and can relieve the springs from pressure by dropping the shafts down. In this, as in Fig. 4, I can remove the shafts, and replace them, with greater facility than in Fig. 1, and with but slight effort, inasmuch as I have not the force of the springs to contend with; they (the springs) only acting when brought in contact with the projection. There is very little wear in springs, Figs. 4 and 7, as the surfaces in contact have but slight movement.
It will be evident that the same operation is performed by the springs in all the positions represented, viz, to keep the shaft eyes against the bolt, in the direction of the pull of the animal, and simultaneously to keep the bolt to the forward part of the eyes of the clip (A,), by this means the surfaces upon which the strain comes are always in close contact, lessening or preventing the noise and wear of the parts resulting from looseness and rattling heretofore usual at this part.

Having thus described my said invention I wish it to be understood that I do not claim broadly a spring applied at the point of connection between the clip and shaft, but

What I claim as my invention and desire to secure by Letters Patent is—

Extending the plate (*c*,) of the carriage clip in the form of a spring to the eye of the shafts, and causing said spring to operate on the aforesaid eye in the direction of the pull, to keep the parts of the bolt and eyes in contact for the purposes and as specified.

DANL. J. RIKER. [L. S.]

Witnesses:
JAMES RIKER,
J. M. WATSON.